United States Patent Office 2,988,488
Patented June 13, 1961

2,988,488
ENZYMATIC DEHAIRING OF HIDES AND SKINS
Robert S. Robison, Roselle, and Walter J. Nickerson, Princeton, N.J., assignors to The Mearl Corporation, Ossining, N.Y., a corporation of New Jersey
No Drawing. Filed Apr. 11, 1958, Ser. No. 727,789
2 Claims. (Cl. 195—6)

This invention is a continuation-in-part of copending application Serial No. 655,516, filed April 29, 1957, now abandoned, and relates to the preparation of animal hides or skins for tanning, and more particularly to an improved process and composition for dehairing such sides and skins.

In accordance with the methods of the prior art, animal skins and hides are first soaked in cold water from one to three days to rehydrate them and to remove salt, blood, dirt and part of the interfibrillary proteins. They are then green-fleshed to remove the subcutaneous flesh layer. The hides are then limed in baths containing hydrated lime with or without various sharpeners for from two to five days. This destroys the epidermis and loosens the hair which is removed mechanically. The dehaired, alkali-swollen skins are then delimed by immersion in weak solutions of various ammonium salts, or weak acids to reduce the swelling and adjust the pH value to about 8–9 which is favorable for bating. The bating steps which involve the use of pancreatic trypsin or other tryptic-like enzymes from various sources, take from two to twenty-four hours, depending both on the type of skin or hides and the leather to be derived. Its main function appears to be the removal of various protein degradation products. This results in a flaccid open skin suitable for tanning.

In accordance with the present invention, a novel enzymatic method has been found whereby the preparation of such hides and skins for tanning is greatly simplified.

Accordingly, it is an object of this invention to provide a simple, economical, and efficient method for directly preparing animal hides or skins for tanning.

Another object of this invention is to provide an enzymatic method for simultaneously dehairing and bating such hides.

Another object of this invention is to provide an enzymatic method for the rapid and efficient removal of hair from such hides or skins.

Still another object of this invention is to provide a novel enzymatic composition which will achieve these results.

These and other objects of the present invention will become more apparent from the following discussion.

It has now been found that the dehairing of animal hides and skins by the use of hydrated lime alone, or lime and various sharpeners, can be eliminated by the use of a proteolytic enzyme preparation elaborated as a result of the microbial activities of a number of Streptomyces and bacterial cultures.

This proteolytic enzyme, which has been isolated and characterized, has been called keratinase because of its ability to digest native, unaltered keratin. Its production, isolation and characterization is described in Nickerson et al. copending application Serial No. 680,930, filed August 29, 1957.

As stated in the aforesaid application the enzyme composition is one which is effective to digest a substantial amount of keratinaceous material including the trypsin-digestible protein of said material and a substantial amount of the keratin protein of said material that is indigestible by trypsin, said proteolytic enzyme being characterized (a) by being water soluble; (b) by being non-dialyzable; (c) by having its keratin-digestive-ability destroyed by heating to about 100° C. for five minutes; (d) by having its maximum keratin-digestive-ability at a pH in the range of about 8.5 to 9.5; (e) by being precipitable from an aqueous solution thereof by the addition of ammonium sulphate; and (f) by having its keratin-digestive-ability dependent on the presence of at least trace amounts of chelatable metal ions.

In accordance with the instant invention it has been found that the micro-organism elaborating the keratinase also produces small but effective amounts of other types of proteolytic enzymes, which, for example, will digest casein and gelatin and, which when used in combination with the keratinase will assist in the bating operation and permit the use of a single enzyme preparation for the simultaneous dehairing and bating of animal hides and skins. This causes a significant reduction in the number of steps and time required for preparation of hides and skins for tanning.

The use of the keratinase enzyme herein contemplated results in a highly economical dehairing process, as green salted animal skins and hides can be dehaired and bated without the necessity of providing a soak bath, or the separate steps of deliming and bating. Moreover, dehairing with the keratinase enzyme causes less injury to the hair and wool and thereby yields by-products which are in better condition and more valuable.

The hides or skins obtained after dehairing and bating with the present microbial keratinase enzyme preparations have a soft or flaccid feel. They are sufficiently soft so that, as a rough test, they will retain the impression of a thumb print. In addition these skins and hides have a clean, smooth, and low or flat grain, and the grain is sufficiently open so that water and air will pass through the fiber structure with ease when hand pressure is applied in a squeezing action.

In the present process, dehairing and bating is accomplished with a number of different types of keratinase preparations among which are filtered enzyme-rich broths or liquors, either concentrated or unconcentrated, dried powders prepared from concentrates by the addition of either wood flour or other inert materials or fillers with subsequent drying at temperatures below 40° C., or dry powder prepared directly from the enzyme-rich filtered liquor. Enzyme preparations of greater purity and activity obtained by the conventional techniques of solvent or salt precipitation procedures can also be used. However, the preferred procedure entails the use of relatively crude enzyme preparations. It is appreciated that the amount of enzyme required will vary with the purity of the preparations, the hide/water ratios, the type skin, the rapidity with which the dehairing and bating processes are to be accomplished and the presence of or absence of suitable enzyme activators, which are hereinafter referred to.

In a specific embodiment, the enzyme preparations containing keratinase as well as other proteolytic enzymes is made by a process described in copending application Serial No. 680,930 of Nickerson et al. Although this method per se forms no part of the present invention, it is now briefly described in order to provide a full and complete disclosure of how this material may be prepared.

The keratinase-containing proteolytic enzyme mixture may be produced by the treatment of various keratinaceous materials with microorganisms under conditions such as to facilitate degradation, the degradation products being water soluble. Such microorganisms include *Streptomyces fradiae, Streptomyces griseus, Streptomyces griseoluteus, Streptomyces rimosus* and *Streptomyces parvus*. These organisms are described on pages 97, 87, 52, 47 and 46, respectively, of "Actinomycetes and Their Antibiotics," by Waksman and Lechevalier. Strains of these microorganisms have been deposited in the culture collection of the Institute of Microbiology of Rutgers, the State University, New Brunswick, New Jersey, and all the numbers hereinafter recited refer to the numbers in this collection. A strain of *Streptomyces fradiae* which has been found especially useful in preparing the keratinase enzyme is No. 3739 which has been isolated from soil and which has been shown to be of the species *Streptomyces fradiae*.

Keratinaceous materials which are available to be treated in this manner are, for example, animal hair, hoofs of slaughtered animals, chicken feathers, fish scales, etc. The treatment of this keratinaceous material for the production of keratinase is best carried out in an aqueous solution containing mineral salts, which for best results during fermentation should have a pH in the range of about 6.5 and 8.8, and preferably between about 7.2 and 8.5. It is to be noted that the pH rises as the fermentation proceeds. The pH control may be attained by suitable buffering. In a period of from three to five days, after suitable aeration and agitation, the fermented enzyme-rich broth is ready for harvest and recovery.

The resulting enzyme is a proteolytic enzyme capable of digesting native, unaltered keratin in keratinaceous material and liberating therefrom water soluble polypeptides, said enzyme being further characterized in that it is non-dialyzable, heat denaturable, and precipitable with alcohol, acetone, and ammonium sulfate, said enzyme not requiring pre-treatment of keratin by material containing sulfhydryl groups or by reducing agents for its operation as a keratin-digesting medium.

The present hide treating process is operable with either soaked or unsoaked hides or skins preserved either by drying, salting or any other technique. It has been found, however, that the hair can be loosened and removed both at lower keratinase enzyme concentrations and in a shorter period of time when soaked, fleshed hides or skins are used as the starting material. The times of treatment will generally range from two to eighteen hours.

The soaked, green fleshed or unsoaked green salted or flint or air dried animal hides or skins are placed into a paddle or other suitably agitated tank or drum filled with a solution of the keratinase-proteolytic enzyme mixture of known concentration. Best results are obtained when the hide or skin to water ratio is approximately 1:4, but the process is fully operative at hide to water ratio of 1:3 to 1:6.

For maximum activity of both the keratinase and the other general proteolytic enzyme present, the pH should be maintained between about 7.0 and 10.0 and preferably in the range of about 8.0 to 9.5. The pH is adjusted by the addition of alkaline substances such as sodium borate, NaOH, $Na_2CO_3$, $K_2HPO_4$, hydrated lime or other suitable buffers, when desired. The amount of alkali required will, of course, vary with the weight of hide, the type of hide, its source, and the hardness of the water and the alkali compound used.

Like all other enzymatic reactions, the rate of dehairing and bating by the keratinase-proteolytic enzyme mixture is a function of the temperature employed. It has been found that the dehairing and bating can be accomplished at temperatures between 20° C. and 40° C., but it is preferred to operate at temperatures between 25° C. and 35° C. primarily because this temperature of operation can be maintained without an external source of heat. Higher temperatures between 30° C. and 40° C. can be used resulting in an accelerated rate of dehairing and bating, but, of course, require heating of the enzyme bath.

Agitation of the enzyme solution and the hides and skins provides for more rapid and uniform dehairing and bating. With constant agitation or agitation at frequent intervals the separate step of dehairing by machine after liming, as practiced in the prior art, is no longer necessary. The combined action of the keratinase-containing enzyme preparation and the agitation serves to remove the hair from the hide or skin. The hair can be easily recovered by conventional techniques from the enzyme solution. The recovered hair after washing is in a condition directly suitable for further use while the skin is ready for pickling and tanning without subsequent bating. Alternately, with less agitation, more of the loosened hair remains attached. This hair can be recovered and removed by the use of conventional dehairing machines.

A number of neutral salts can be added as activators to provide more rapid dehairing and bating and the use of lower enzyme concentrations. Among these salts are NaCl, KCl, $Na_2SO_4$ and $MgSO_4$ which can be used in the concentration range of 0.05 to 5.0 percent with a preferred range being 0.1 to 0.5 percent. With green-salted hides, the addition of a neutral activator is not necessary. Reducing activators such as NaSH, $NaHSO_3$ and salts of thioglycolic acid, e.g. sodium thioglycolate may also be added, but are not essential.

The requisite time to carry out this process varies, of course, with temperature, pH, enzyme concentration and activity, presence of activators and other process variables. It is apparent, however, that in the present procedure, dehairing and bating can be accomplished in less than twenty-four hours, and in as little as five hours, while significant dehairing can occur in two hours.

An important factor in determining the requisite time is the enzyme activity. Specifically, soaked calfskin has been dehaired and bated in as little as ten hours at 35° C. with an enzyme solution containing 400 keratinase units/ml. and with the addition of 0.5 percent sodium chloride. The treatment not only loosened the hairs sufficiently so that they were easily removed by hand from the skin, but produced a well bated hide suitable for further processing.

It is understood that the time of treatment can be further shortened where it is desired to use the present enzyme composition only as a dehairing agent and subsequent bating is to be effected by treatment with other enzyme preparations.

The preservatives or disinfectants used for the prevention of undesirable microbial development during the process are added in an amount of about 0.2 to 1 part per 1000 parts of enzyme solution and would include such compounds as phenol and various phenol derivatives, cresylic acid, beta-napthol, pine oil and other standard preservatives.

The hair which is removed from the hide or skin during the enzyme treatment is readily recovered from the enzyme liquor by decantation, filtration or other suitable separation techniques. Moreover, after removal of the hair, the clear liquor may be re-used alone, or in combination with fresh enzyme solution for the treatment of subsequent batches of hides or skins.

The amount of the several keratinase containing enzyme preparations which can be used for the simultaneous processes of hair loosening and bating will vary with the activity of the preparation and the weight and surface area of the hides and skins. One unit of keratinase as herein defined is that amount of enzyme which will digest wool keratin to the extent of producing an increase in optical density at 280 millimicrons (2800 A.) of a .040 in three hours at a pH of 8.6. Thus, the weight of an enzyme preparation to produce this effect will vary with the purity and activity of the preparation. For example, in a dried broth preparation, one unit of keratinase is present in approximately 100 μg. of material while with a preparation prepared by ammonium sulfate precipitation, of 10 μg. of the precipitate contains one unit of keratinase. As a practical matter, for the dehairing and bating of soaked-fleshed skins or hides the keratinase activity should be between about 20 and 200, while for green, salted hides or skins the activity will generally be higher, e.g. between 250 and 600 keratinase units/ml.

For the purpose of illustrating, but not limiting the present invention the following examples are cited:

Example I

Six hundred pounds of green salted calfskins were placed into a paddle tank containing 288 gallons of an enzyme solution containing 300 keratinase units/ml. prepared by the addition of a dried enzyme preparation derived from the action of *Streptomyces fradiae* J. M. No. 3739 on autoclaved hoof meal in a mineral salt medium. The pH of the enzyme bath was adjusted to 9.0 with approximately 1.5 pounds of hydrated lime. The temperature of the enzyme dehairing solution was between 75 and 85° F. and agitation was provided intermittently. To prevent undesirable microbial growth approximately one part of a chlorinated phenolic compound to 2000 parts of the solution was added as a preservative. After 16 hours a good proportion of the skin has been freed of hair and the remaining loose hair was easily removed by use of a conventional dehairing machine. The dehaired skins were then fleshed and scudded and were ready for further processing.

Example II

Five hundred thirty-five pounds of soaked green fleshed calfskins were simultaneously dehaired and bated at 85° F. in a paddle tank by immersion in 290 gallons of an enzyme containing keratinase in association with proteolytic enzyme at a concentration of 240 keratinase units/ml. of solution. The pH was adjusted to 9.0 with hydrated lime and a preservative was added in such quantities as to result in a final concentration of one part to 2000 parts of the enzyme solution. After fifteen hours with intermittent agitation, most of the hair has been removed from the skin and the skin has been bated. The remaining hair is easily removed by a conventional dehairing machine. Both this hair and that present in the enzyme bath is of high quality and is easily recovered by conventional techniques. The dehaired, bated skins are now ready for further processing by pickling and tanning.

Example III

One hundred pounds of soaked goat skins are treated with four hundred pounds of water containing 450 keratinase units/ml. of an enxyme mixture of keratinase-containing proteolytic enzymes. The pH was adjusted to 9.1 obtained by the addition of sufficient sodium hydroxide or sodium carbonate. To prevent undesired microbial development a preservative is added from among the group including phenol, toluene, or various phenol derivatives. After fifteen hours at 35° C. with agitation, the skins are removed from the bath substantially free of hair and are then washed and are ready for further processing by pickling or tanning.

Example IV

One hundred pounds of salted calfskins are soaked, washed and green fleshed in the customary manner. The skins are then immersed in 400 pounds of an enzymatic liquor of microbial origin containing keratinase and proteolytic enzymes containing 150 keratinase units per ml. for simultaneous hair loosening and bating. The pH of the enzyme liquor is adjusted to 8.5 by the addition of a sodium borate buffer and the temperature is maintained at 35° C. Toluene is added as a preservative. After eighteen hours with intermittent agitation the skins are substantially free of hair, washed in cold water and are ready for further processing, i.e. pickling and/or tanning.

While the above examples are representative of the present process, it is not intended to be limited thereby. The process is operative with other types of skins and hides and other methods of application. Thus, skins of lamb, kangaroo, rabbits and other animals may also be effectively treated by this method. Moreover, the application of the keratinase-containing enzyme preparation may be by means of a paste applied to the animal skin.

In another procedure, cattle hides which have recently been removed from slaughtered animals were dehaired by immersion in a solution containing 500 keratinase units/ml. and having a pH of 9.0 produced by the use of slaked lime. The dehairing is accomplished in 15 hours at 28° C. and the hides were then washed, fleshed and brined prior to shipment to tanneries.

Each of the above examples showing specific modes of carrying out the present hide-treating process, is also operative with keratinase enzymes derived through the action of the following strains of the Streptomyces species listed below.

| Species: | Strain No. |
| --- | --- |
| Griseus | I.M. 3475 |
| Parvus | I.M. 3686 |
| Griseoluteus | I.M. 3718 |
| Rimosus | I.M. 3556 |

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appending claims.

We claim:

1. The method for dehairing hides and skins and preparing the same for tanning, which comprises immersing said hides and skins, without prior treatment thereof effective to degrade the keratin protein therein, in an aqueous solution containing a proteolytic enzyme effective to digest a substantial amount of keratinaceous material including the trypsin-digestible protein of said material and a substantial amount of the keratin protein of said material that is indigestible by trypsin, said proteolytic enzyme being characterized (a) by being water soluble; (b) by being non-dialyzable; (c) by having its keratin-digestive-ability destroyed by heating to about 100° C. for five minutes; (b) by having its maximum keratin-digestive-ability at a pH in the range of about 8.5 to 9.5; (e) by being precipitable from an aqueous solution thereof by the addition of ammonium sulphate; and (f) having its keratin-digestive-ability dependent on the presence of at least trace amounts of chelatable metal ions, said solution having a keratinase activity between 20 and 600 keratinase units per ml., and agitating said hides and skins in said solution, thereby effecting dehairing of said hides and skins in said solution.

2. The method for dehairing hides and skins and preparing the same for tanning, which comprises soaking said hides and skins and then directly, without any intermediate alkali treatment of the same, immersing the same in an aqueous proteolytic enzyme solution in which the enzyme is characterized by its ability to digest native, unaltered keratin, said enzyme being derived from the treatment of keratinaceous material with a strain of *Streptomyces fradiae,* said solution having a keratinase activity between 20 and 600 keratinase units per ml., and being maintained at a temperature in the range of 20° C. to 40° C., and at a pH between 8.0 and 9.5 for a period of time between about five and twenty-four hours, with said solution and said hides and skins agitated at at least frequent intervals in said period, thereby effecting dehairing of said hides and skins while in said solution without injury to said hides and skins and without injury to the hair removed therefrom, and then removing the said dehaired hides and skins from said solution in a condition ready for pickling and tanning.

References Cited in the file of this patent
UNITED STATES PATENTS

| | | |
|---|---|---|
| 1,772,258 | Le Petit | Aug. 5, 1930 |
| 1,812,921 | Boidin | July 7, 1931 |
| 2,158,499 | Grassmann | May 16, 1939 |
| 2,278,233 | Ayres | Mar. 31, 1942 |
| 2,521,582 | Keil | Sept. 5, 1950 |
| 2,857,317 | Grimm | Oct. 21, 1958 |
| 2,927,885 | Deltour et al. | Mar. 8, 1960 |

OTHER REFERENCES

Waksman: The Actinomycetes, 1950, Chronica Botanica Co., Waltham, Mass., pages 100–103.

Summer et al.: Chemistry and Methods of Enzymes, 3rd Ed., 1953, Academic Press Inc., New York, page 179.

Ward et al.: Advances in Protein Chemistry, vol. IX., 1954, Academic Press, Inc., Pub. N.Y., pages 272–273, 292–295.